United States Patent Office 2,740,691
Patented Apr. 3, 1956

2,740,691

PROCESS FOR THE RECOVERY OF LIME AND HYDROGEN SULFIDE FROM CALCIUM SULFATE

Albert L. Burwell, Norman, Okla., assignor to University of Oklahoma Research Institute, Norman, Okla., a corporation of Oklahoma No Drawing. Application May 25, 1953,
Serial No. 357,387

3 Claims. (Cl. 23—181)

This invention relates primarily to the recovery of sulfur from naturally occurring deposits of calcium sulfate, with the recovery of a high quality lime as a co-product. It applies also to by-product calcium sulfate.

A study of the patent literature will reveal many processes for the decomposition of gypsum or anhydrite. An economic consideration of the prior art processes makes it clear that commercial operations are feasible only when both the calcium and sulfur components are recovered in commercially valuable forms. This requirement eliminates from serious commercial consideration all of the prior art processes in which metallic oxides, sulfides, or other metallic compounds were added to the gypsum or anhydrite before decomposition, since these additives emerge from the process as contaminants of the calcium product. Also eliminated are those processes in which carbon is mixed directly with the calcium sulfate, since the calcium product produced thereby is impure and not a commercially desirable product. The many other processes of the prior art, are also not practical processes since the end products are not commercially valuable.

A process in which the end products are lime and sulfur dioxide would be commercially attractive only if the lime should meet the purity requirements of industry. Up till the present time, no process has decomposed calcium sulfate into lime and sulfur dioxide of sufficient purity to make the process commercially attractive.

The object of this invention is to provide a process for the decomposition of calcium sulfate into lime of commercially acceptable purity, and into sulfur in a form in which the sulfur is easily recoverable.

Another object of the invention is to provide a process for decomposing gypsum or anhydrite into commercially desirable end products by using inexpensive, naturally occurring reactants for the decomposition.

A further object of the invention is to provide a process in which sulfur in a pure form may be obtained in quantity from natural sources other than sulfur beds.

These and other objects of the invention are achieved by heating granular or powdered calcium sulfate in a stream of a mixture of a reducing gas or gases and steam. If natural gas, principally methane, or a mixture of hydrocarbons is used as the reducing gas, then a temperature of 900° to 1000° C. should be used, to prevent the formation of calcium carbonate. If hydrogen is used as the reducing gas, then there is no formation of carbon dioxide during the reaction, therefore no danger of the formation of calcium carbonate, and much lower temperatures may be employed. In the latter case, the temperature used will be the one found to give the highest yield with the particular apparatus in use.

The presence of steam is essential. The exact function of the steam is not known, but it probably fulfills many functions in the over-all reaction. For instance, there is always the possibility that calcium sulfide may be formed during the decomposition of calcium sulfate. Calcium sulfide does not dissociate at the temperatures used in this process when dry, but decomposes readily in the presence of water vapor. Further, when the calcium sulfate has decomposed into calcium oxide, a continuous stream of steam alone over the hot calcium oxide will prevent the undesirable formation of carbonates by excluding the atmosphere, and as the oxide cools, if the stream of steam is continued, calcium hydroxide will be formed.

While the complete mechanism of the reactions taking place during this process are not fully understood at present, there are several plausible theoretical equations which may be postulated as representing what happens as the steam and reducing gas flow over and through the calcium sulfate. For instance, any of the following equations could apply:

(1) $$CH_4 + 4CaSO_4 \cdot 2H_2O \rightarrow 4CaO + 4SO_2 + CO_2 + 4H_2O$$

(2) $$3CH_4 + 4CaSO_4 \cdot 2H_2O \rightarrow 4CaO + 4S + 3CO_2 + 8H_2O$$

(3) $$CH_4 + CaSO_4 \cdot 2H_2O \rightarrow CaO + H_2S + CO_2 + 3H_2O$$

Each of these equations shows the production of lime plus a sulfur product. In practice, Equation 3 seems to be the most accurate portrayal of the operating conditions, since the resultant gases contain hydrogen sulfide and carbon dioxide in appreciable quantities. It is theoretically possible that some calcium sulfide is produced during the decomposition, as follows:

(4) $$CH_4 + CaSO_4 \cdot 2H_2O \rightarrow CaS + CO_2 + 4H_2O$$

If (4) does occur, the presence of the steam immediately causes decomposition of the calcium sulfide to calcium oxide, as follows:

(5) $$CaS + H_2O \rightarrow CaO + H_2S$$

The equations suggested above in explanation of the process are based upon the use of methane as the reducing gas. It will be understood that this is for simplicity in representing the reaction. In commercial operation of the process, natural gas may be used, or a mixture of methane with other gases. When hydrocarbon gases are used, the use of steam is essential, and the temperature range appears to be critical. As the equations demonstrate, whenever hydrocarbons are present in the reducing gas, carbon dioxide will react at once with the calcium oxide to form calcium carbonate, which would definitely be undesirable. However, if the temperature is maintained above the dissociation temperature of calcium carbonate, there will be no formation of this undesired compound. This requirement fixes the lower operating temperature limit at 890° C. The upper limit is fixed by the lime product which must be produced for commercial purposes. If calcium oxide is heated much higher than 1000° C., there results an "over-burned" lime, which is characteristically less reactive than limes produced at a lower temperature. The operating temperature range for hydrocarbon gases is therefore 890° C. to about 1000° C. The range of 900° C. to 1000° C. is preferred for simplicity of operation.

The steam which is introduced to the reaction chamber along with the hydrocarbon gas may be readily produced by a simple boiler. It is not necessary to use superheated steam, although this may be employed if it is conveniently available.

It is essential for efficient operation of the process that an excess of both the hydrocarbon gas and steam be employed and that the amount of steam be in excess of that theoretically reactable with the excess of hydrocarbon gas. The presence of an excess of each of these reactants tends to drive the reactions taking place to completion in the desired direction.

The reactions above described may be carried out in any convenient apparatus. The reaction is begun by charging a chamber with granulated or powdered calcium sulfate, passing hydrocarbon gases through the charge of calcium sulfate until the air in the chamber has been replaced, then bringing the chamber up to 900° C. The reducing gas and steam are then passed over the charge until the effluent gases indicate that the reaction has been complete. The apparatus is then cooled slowly as steam is passed through the chamber. The presence of steam excludes air from the hot lime and prevents carbonate formation. The passage of steam also serves to carry off any gaseous reaction products and assures decomposition of any residual calcium sulfide. If the solid calcium product desired is calcium oxide, the steam is stopped before a temperature of 580° C. is reached, since below this temperature calcium hydroxide will be formed. A cut-off temperature for steam of about 800° C. has worked well. After the steam passage is stopped, dry, carbon-dioxide-free air is passed into the reaction chamber, so that all of the hydrogen sulfide and carbon dioxide are removed before the temperature is lowered to 600° C. and below. If a hydrated lime is desired, the steam flow is continued down to temperatures below 580° C., but is discontinued at about 120° C. or at a somewhat higher temperature.

It is also theoretically possible that the mixture of the hydrocarbon gases and steam react together, before reacting with the calcium sulfate. Such an intermediate reaction of the steam and hydrocarbons would produce carbon monoxide, or hydrogen, or both, probably as follows:

(6) $CH_4 + H_2O \rightarrow 3H_2 + CO$

A further possibility would be:

(7) $CO + H_2O \rightarrow H_2 + CO_2$

The reactions of carbon monoxide and hydrogen, respectively, with calcium sulfate, proceeds as follows:

(8) $CO + CaSO_4 \cdot 2H_2O \rightarrow CaO + SO_2 + CO_2 + 2H_2O$ (9) $4H_2 + CaSO_4 \cdot 2H_2O \rightarrow CaO + H_2S + 5H_2O$ It is believed that Reactions 6 and 7 do not take place to any great extent in the reaction chamber, but Reactions 6 to 9 are probably side reactions which do occur. (These reactions do suggest that where water gas is available in quantity at a low price, it could be employed as the reducing gas in the process but it is recognized that the sulfur derivatives would be of different composition, the formation of free sulfur and oxysulfide would be expected.)

If desired, hydrogen may also be used as the reducing gas. If hydrogen alone is used, unmixed with hydrocarbon, a different set of operating conditions must be used than is used with the hydrocarbons. The reaction of calcium sulfate with hydrogen may be expressed by the equation:

(10) $CaSO_4 \cdot 2H_2O + 4H_2 \rightarrow CaO + H_2S + 5H_2O$

As in the process in which hydrocarbons are employed, an excess of hydrogen and steam should be employed. The excess of hydrogen tends to drive the reaction to completion in the desired manner. The excess of steam prevents the formation of calcium sulfide, and removes the gaseous products of decomposition, thus preventing undesired side reactions. Experience in operation of the process indicates, however, that only a very slight excess of hydrogen is necessary for good results. The temperature may be regulated so as to give a good yield, and is not critical, as is the case when hydrocarbons are present in the reducing gas. If a dry calcium oxide product is desired, the operating temperature must be above 580° C., which is the dissociation temperature for calcium hydroxide.

The processes outlined above provide a commercially feasible process for obtaining sulfur from calcium sulfate. The sulfur-bearing gases produced by the process may be treated by known means to recover the sulfur product desired. The product gases are a mixture of hydrogen sulfide, carbon dioxide, water vapor, and unaltered hydrocarbons or hydrogen, and, may be treated by known means with the ultimate purpose of converting the hydrogen sulfide to commercial use, or of converting it to more desirable forms.

The processes also provide for the production of lime. The lime will correspond in purity to the input material. It is the production of a desirable calcium product which makes the entire process commercially feasible.

Two fundamental processes have been disclosed. In one process, a mixture of reducing gases containing hydrocarbons is employed. The alternative process uses hydrogen as the reducing gas. In each process, steam is used in conjunction with the reducing gas. The use of steam is essential to obtain the desired purity and a high conversion of the calcium sulfate to the desired products. It is essential that an excess of water vapor above the amount theoretically required by the reaction formulae be used, to obtain satisfactory results. The excess steam apparently is required to provide for prompt removal from the reaction chamber of the gaseous reaction products. There may also be some other beneficial action of the excess steam, but if so, it is not recognized specifically at present.

To more completely describe the invention, a series of illustrative operations will be described. In each case, the same apparatus was used. The apparatus comprised a train centering around an electric furnace. The furnace was provided with a tube in which the charges of calcium sulfate were placed. The inlet end of the tube was provided with sources of reducing gas and steam the flow of which could be regulated. The outlet end of the tube was provided with traps and a condenser for removing volatiles, and an absorber for scrubbing sulfur-containing gases from the effluent stream.

*Example I*

A charge of granular gypsum was placed within the furnace tube. A solution of slightly acidic lead acetate was placed in the absorber on the outlet side to absorb any sulfur-containing gases. Natural gas was passed through the system to flush out all air, and then heat was applied. When the temperature was approximately 900° C., natural gas was passed through the system. After a brief interval the heat in the furnace was turned off, and natural gas was continued through the system until the system reverted to room temperature. The solid contents of the tube were found to be heavily coated with carbon black. The gypsum appeared to be somewhat altered, and there was a considerable amount of calcium sulfide present. Some hydrogen sulfide had been formed and was deposited as lead sulfide in the absorption flask. This run showed conclusively that gypsum cannot be successfully decomposed with reducing gas alone.

Similar operations with anhydrite as the calcium sulfate and natural gas, and with both gypsum and anhydrite, separately, with hydrogen as the reducing gas, confirmed the conclusion that calcium sulfate cannot be successfully decomposed to the desired products by this reducing gas alone.

*Example II*

A second operation was conducted in the same manner as in Example I, except that the natural gas was bubbled through warm water before it entered the tube. In this case, less carbon was found in the solid residue in the tube, and more hydrogen sulfide passed to the absorber. The operation did not itself hold any promise of commercial success, but indicated that the presence of water vapor had an unpredictable beneficial effect.

Example III

In this operation, the procedure of Example I was again followed, with the exception that steam was introduced into the tube in an amount above that theoretically required. The gypsum was almost completely converted to calcium oxide. A minute amount of sulfide was detectable in the oxide, but the amount was not significant. No carbon deposits remained on the calcium oxide.

During repeat runs in which steam was used as in Example III, along with the reducing gas, a 30% solution of sodium hydroxide was substituted for the lead acetate on the output side of the tube. It was found that the sodium hydroxide absorbed large amounts of both carbon dioxide and hydrogen sulfide.

Example IV

Powdered gypsum was placed in the furnace tube. A stream of pure hydrogen was passed into the tube until all of the air had been flushed out. The tube was then heated to 650° C. and hydrogen and steam were passed into the tube. When the effluent gases indicated that the reaction had terminated, the heat was removed, and the passage of steam was discontinued. The tube was flushed continually as it cooled by a stream of hydrogen, which was recoverable for reuse. Upon cooling, the solid residue in the tube was found to be a pure, high grade calcium oxide.

The process has thus far been described as a batch process, but it is much more efficient when operated as a continuous process. For large, continuous, commercial production, a rotary-type kiln, a fluidized-bed reactor or a slowly descending granular bed reactor may be used. The raw material may be fed to the kiln under gas-tight conditions. The discharge end may be gas-tight also. Heat may be supplied from a source external to the kiln.

It should be clear from the description thus far, and from the examples, that the particular reducing gas used is not critical. A mixture of natural gas or other hydrocarbons and steam may be used. Hydrogen or hydrogen bearing gases may be substituted in part or in entirety for the natural gas. Any reducing gas of the desired characteristics may be used in the process.

While the process has been described to show its particular utility where large natural deposits of gypsum or anhydrite and natural gas are available, it will be obvious that the process is admirably adapted for operation in conjunction with other industrial processes. For instance, the process could be associated with the production of "furnace" carbon black, and consume the residual hydrogen produced in that industry. The process could also be associated with the manufacture of synthetic ammonia, utilizing hydrogen as produced for that industry. The industrial potential for the process is very broad.

I claim:

1. A process for the recovery of lime and hydrogen sulfide from calcium sulfate which comprises simultaneously passing a hydrocarbon gas and steam, each in amounts in excess of the theoretical, through finely divided calcium sulfate, at a temperature in the range of about 890° to 1000° C., with the exclusion of oxygen, recovering hydrogen sulfide from the gaseous effluent, and cooling the solid product in the absence of air to recover lime.

2. A process for the recovery of lime and hydrogen sulfide from calcium sulfate which comprises simultaneously passing natural gas and steam, each in amounts in excess of the theoretical, through finely divided calcium sulfate, at a temperature in the range of about 890° to 1000° C., with the exclusion of oxygen, recovering hydrogen sulfide from the gaseous effluent, and cooling the solid product in the absence of air to recover lime.

3. A process for the recovery of lime and hydrogen sulfide from gypsum which comprises simultaneously passing natural gas and steam, each in amounts in excess of the theoretical, through finely divided calcium sulfate, at a temperature in the range of about 890° to 1000° C., with the exclusion of oxygen, recovering hydrogen sulfide from the gaseous effluent, and cooling the solid product in the absence of air to recover lime.

References Cited in the file of this patent

UNITED STATES PATENTS

| 1,213,375 | Huber et al. | Jan 23, 1917 |

FOREIGN PATENTS

| 328,128 | Great Britain | Apr. 24, 1930 |

OTHER REFERENCES

"A Textbook of American Gas Practice," vol 1, 1931 ed., by J. J. Morgan, page 676. Jerome J. Morgan, Maplewood, N. J.

"Fuels, Combustion and Furnaces," by John Griswold, 1946 ed., page 224. McGraw-Hill Book Co., Inc., N. Y.

J. W. Mellor's "A Comprehensive Treatise on Inorganic and Theoretical Chem.," vol. 3, 1923 ed., pages 798–799, Longmans, Green and Co., N. Y., publishers.

Jacobson's "Encyclopedia of Chemical Reactions," vol. 2, 1948 ed., pages 153 and 156. Reinhold Publishing Co., New York, N. Y.